July 10, 1951  V. BROOK  2,560,081
TAPPING MACHINE
Filed Aug. 25, 1948  3 Sheets-Sheet 1

INVENTOR.
Victor Brook.
BY Robert N. Moser
ATTORNEY.

July 10, 1951   V. BROOK   2,560,081
TAPPING MACHINE
Filed Aug. 25, 1948   3 Sheets-Sheet 2
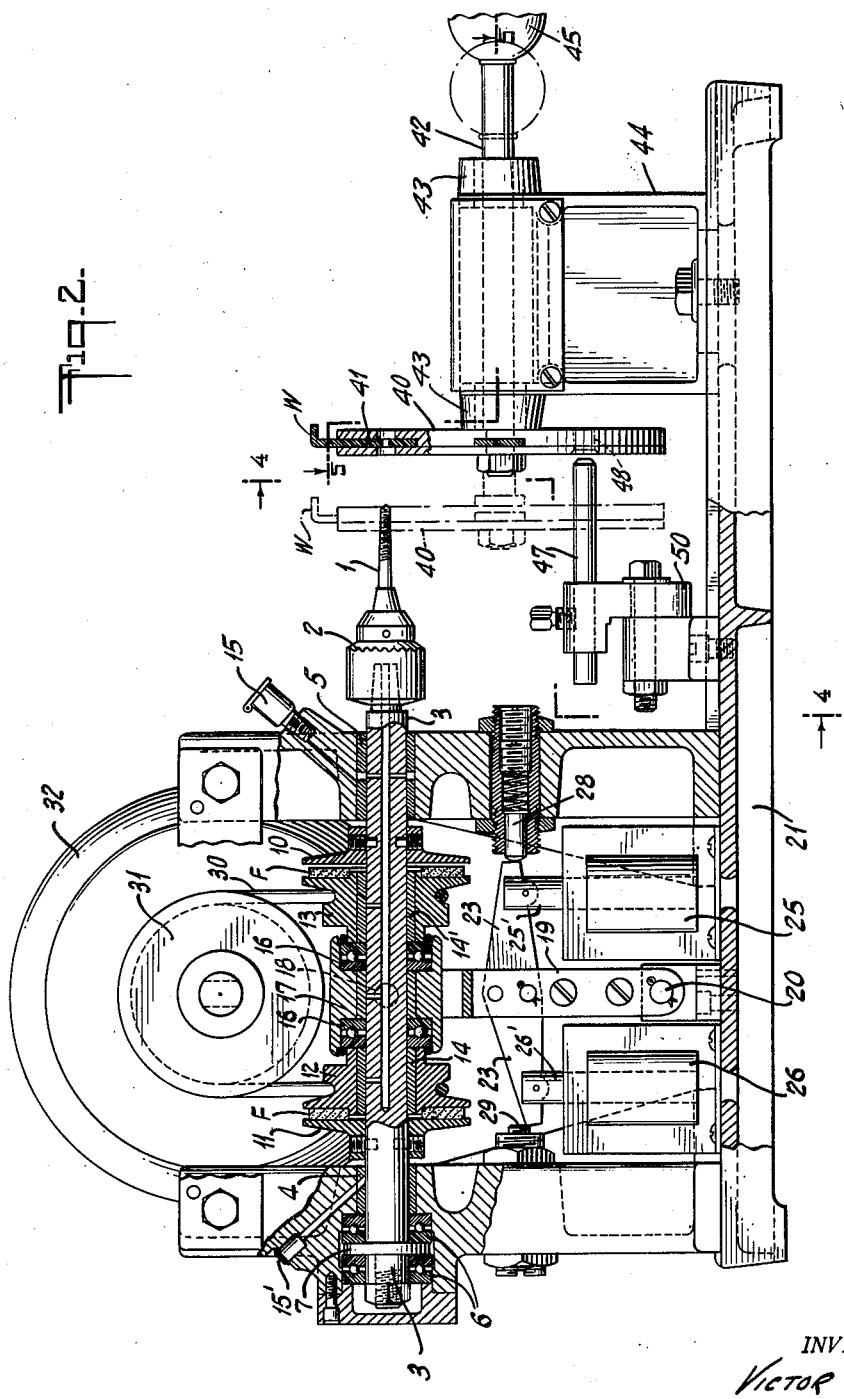
INVENTOR.
Victor Brook.
BY
Robert V. Morse
ATTORNEY.

July 10, 1951 V. BROOK 2,560,081
TAPPING MACHINE
Filed Aug. 25, 1948 3 Sheets—Sheet 3
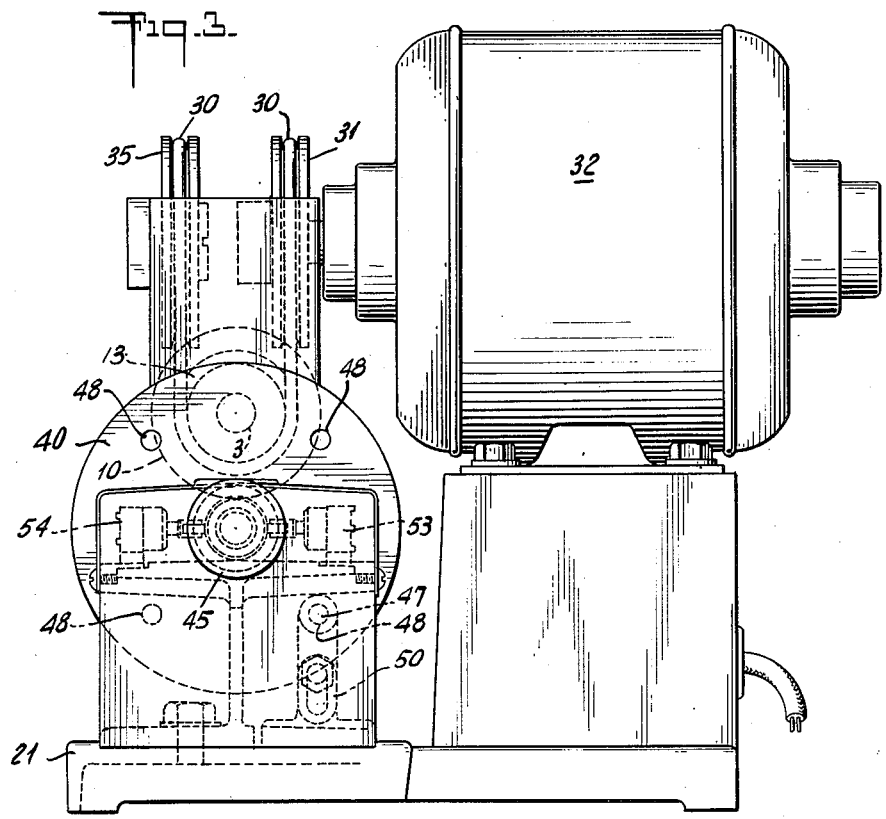
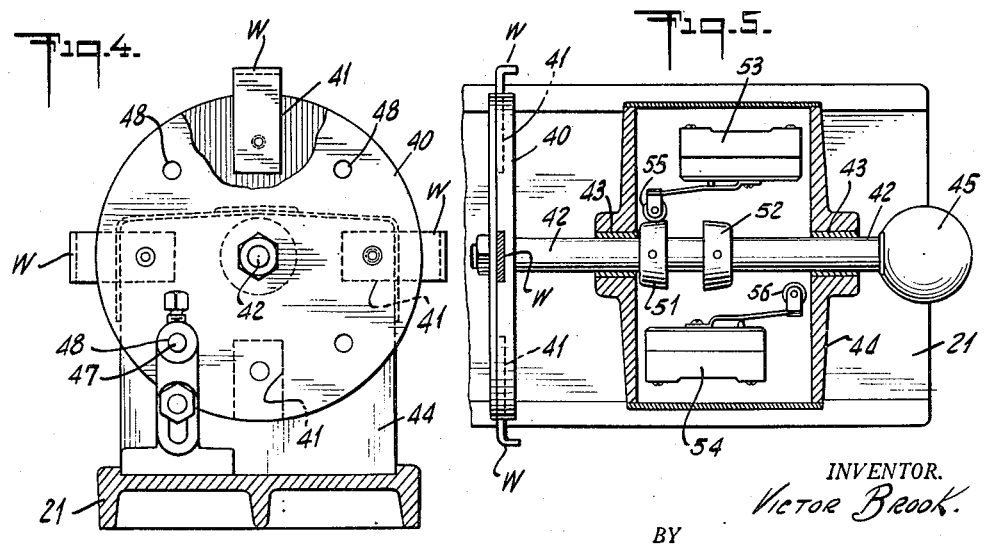
INVENTOR.
Victor Brook.
BY
Robert V. Moran
ATTORNEY.

Patented July 10, 1951

2,560,081

UNITED STATES PATENT OFFICE 2,560,081

TAPPING MACHINE

Victor Brook, Rochester, N. Y.

Application August 25, 1948, Serial No. 46,070

1 Claim. (Cl. 10—136)

This invention relates to machine tools, and particularly to high speed machines for tapping screw-threads in small identical items when the volume of production runs into thousands per day. While screwing a tap into a hole in one direction and then unscrewing it in the opposite direction so as to cut a screw thread is in itself a simple process, this common operation develops certain limiting difficulties when it must be done very rapidly. Under such conditions the taps are usually small and delicate, run at high speed, and must be repeatedly reversed practically instantaneously. Furthermore, experience has shown that with such small tools it is generally desirable to retain the human factor to some extent. Overall efficiency and economy therefore involves a nice balance of kinetic and inertia factors, automatic controls, and manual operations.

The present invention combines an instantly reversible driving head for the tap, an automatic electrical shifting mechanism, an interconnected turret feeder, and certain manual controls, which together form a machine which has proved to be most economical in ordinary volume production. More complicated machines may be justified under special conditions, but generally their added cost and upkeep mitigates against their overall economy.

The principal object of the present invention is to produce the most parts for the least money in the volume range indicated; and specifically to improve the driving mechanism so that the reversing is practically instantaneous and can operate thru many thousand cycles a day without undue wear or overheating; to improve the electrical controls and linkages to assist therein; and to coordinate the movements of the operator in running the machine so as to reduce fatigue and obtain overall production efficiency and economy of manufacture. Various other objects incident to the above will become apparent as the description proceeds.

Referring now to the drawings,

Fig. 2 is a side elevation of the same machine, with some of the parts in cross-section on the line 2—2 of Fig. 1.

Fig. 3 is an end elevation viewed from the right of Fig. 2.

Fig. 4 is a cross-sectional view on the line 4—4 of Fig. 2, particularly showing the turret holding the pieces to be tapped.

Fig. 5 is a horizontal cross-sectional view on the line 5—5 of Fig. 2, showing the electrical microswitches operated in conjunction with the turret.

Similar reference numerals refer to similar parts thruout the various views.

Figure 1:
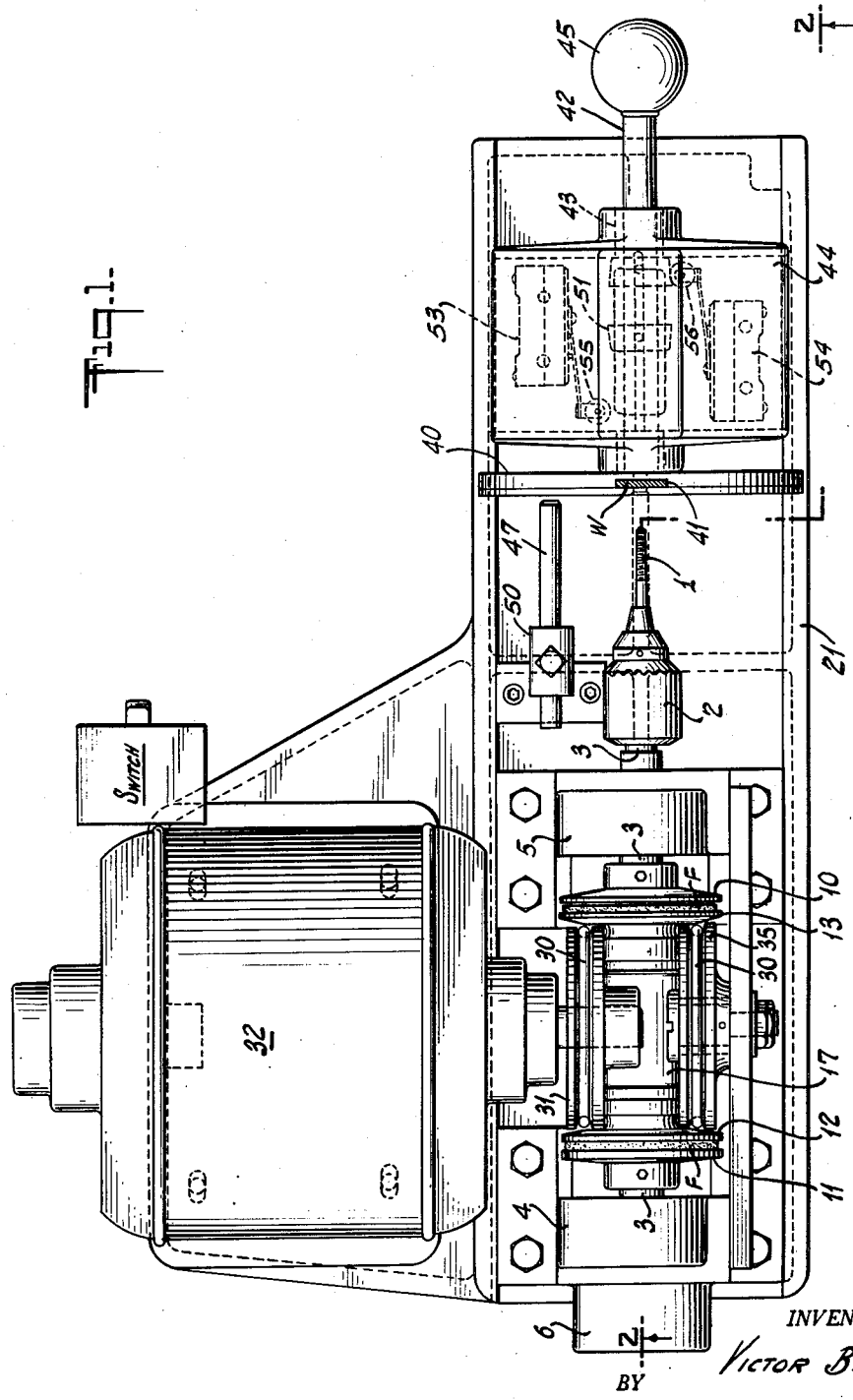
Fig. 1 is a plan view of a typical machine.

Referring now to Fig. 1 and Fig. 2, the tap 1 is held in the chuck 2 which is mounted on the spindle shaft 3 rotating in the bearings 4 and 5, and provided with suitable lubrication as shown in Fig. 2, thru the oil cups 15 and 15'. In order to take the end thrust, the spindle 3 is also provided with ball-bearings 6 (as shown in Fig. 2), operating against the thrust collar 7 on the spindle 3. In high speed tapping it is necessary that the spindle 3 be reversed practically instantaneously, and for that purpose a pair of light disk clutches are provided rotating in opposite directions, as will be described. The driven portions of these clutches consist of the disk 10 and 11 secured to the spindle shaft 3 so as to rotate therewith. The driving portions of the clutches consist of movable pulleys and disks 12 and 13 mounted on bearings 14 and 14' so as to both turn freely and slide axially on the spindle shaft 3. The bearings 14 and 14' are lubricated thru drilled holes in the spindle shaft 3 connected to the lubricating cup 15, which also lubricates the spindle shaft bearing 5.

These driving portions 12 and 13 of the clutches are provided with suitable friction facings F, preferably cork, and are arranged to be slightly movable axially so as to engage either of the driven disks 10 or 11, while disengaging the other. The pulley disks 12 and 13 are accordingly backed by ball thrust-bearings 16 mounted on the sleeve or collar 17 thru which the spindle shaft 3 passes. This sleeve or collar 17 is pivotally connected at 18 to an arm 19 which in turn is loosely pivoted at 20 to the base frame 21. This clutch operating arm 19 is conected by a cross-link 23 to a pair of solenoids 25 and 26, whose plungers 25' and 26' when energized electrically as will be described, operate to swing the arm 19 to the right or left, thus engaging one of the friction clutches 10—13 or 11—12 while disengaging the other. Suitable spring pressed detents 28 and 29 serve to hold the link 23 and the arm 19 positively in one position or the other.

In order that the foregoing mechanism may serve to quickly reverse the direction of rotation of the spindle shaft 3, it is necessary that the pulley disks 12 and 13 with their friction clutch facings F be continuously run at high speed in opposite directions of rotation, so that the disk 10 when engaged will turn the tap 1 one way and when the disk 11 is engaged the tap 1 will be rotated the other way. Accordingly the pulleys 12 and 13 are provided with a belt drive which turns them oppositely to accomplish this purpose. A round belt 30 is preferably used, and runs over a driving pulley 31 on the electric motor 32, which is placed at the side of the machine with its motor axis generally transverse to the axis of the driven shaft 3. The two strands of the belt 30 loop down around the two pulleys 12 and 13 and then up around an idler pulley 35 as shown in Fig. 1. The idler pulley 35 also has its axis in general transverse to the shaft 3 but parallel to the shaft of the motor 32.

It will be seen that when the motor 32 is running the outgoing and return strands of the belt 30 will turn the two pulleys 12 and 13 in opposite directions continuously at full speed; so that when the pulley disk 12 engages the disk 11 the spindle shaft 3 and tap 1 will be rapidly turned one way, and when the pulley disk 13 engages the disk 10 the spindle shaft 3 and tap 1 will be almost instantly reversed and rapidly turned the other way. The friction facings F are alternately cooled while the opposite one is engaged, and with modern facing materials are quite capable of operating continuously for long periods of time without undue wear or heating. The driving motor and pulleys have the advantage of maintaining their full momentum, so that the action of the driven parts is prompt and vigorous. The motor 32 runs continuously in one direction at full speed, while the momentum of the driven shaft 3 and its attached parts is small.

In the present machine the work is moved up to the tap instead of the tap to the work. The work, that is, the pieces to be tapped, must be inserted in a holder, then brought into line with the tap, moved on and off the tap to cut the thread, and then removed from the holder; these movements of the work at the same time electrically energize the desired motions at the clutches operating the tap. The parts accomplishing this are shown at the right hand side of Fig. 1 and Fig. 2, and in Fig. 3, Fig. 4 and Fig. 5.

A turret plate 40 is provided with slots 41, as best seen in Fig. 4, in which are placed the pieces of work W to be tapped. This turret 40 is mounted on the shaft 42 capable of turning and also sliding axially in the bearings 43 mounted in the housing 44 as shown in Fig. 2, Fig. 5 and Fig. 1. The shaft 42 terminates at the other end in the ball handle or knob 45 to fit the hand of the operator. As the operator rotates the turret 40 by means of the knob 45 the pin 47 enters one of the index holes 48 in the turret 40 permitting it to move forward (or to the left in Fig. 2), so that the tap 1 can engage the work W. The pin or rod 47 is adjustably mounted in a suitable support 50 attached to the frame 21 of the machine.

Inside the housing 44, as best seen in Fig. 5, the shaft 42 is provided with two cams 51 and 52 in the form of tapered collars adjustably mounted thereon. Also in the housing 44 are two microswitches 53 and 54 connected thru suitable wiring to the solenoids 25 and 26, by which the direction of rotation of the tap 1 is reversed, thru the action of the clutches 10—13 and 11—12 as described. When the knob 45 is moved inward the roller 55 rides up on the collar cam 51 and operates the micro-switch 53 to reverse the tap 1 so that it will unscrew out of the threaded hole it has tapped in the work W; and when the knob 45 is moved out to the other end of its axial motion, the roller 56 rides up on the cam collar 52 and operates the other micro-switch 54 so as to change the direction of rotation of the tap 1 again, so that it will be rotating in the proper direction to engage and tap the next piece of work W.

In operation the motor 32 runs continuously and the tap 1 is normally rotating one way or the other all the time except during the instants of reversal. The operator, with her right hand on the ball handle 45, inserts the work pieces W in the slots 41 of the turret 40 at her left while the work piece at the top is being tapped. As the turret is rotated to present the next piece of work, the finished work drops out of the turret at the back. These motions permit a smooth and continuous flow of work thru the machine, so that it can handle a large number of pieces in a day. Yet the machine is simple, compact, and economically adapted to its field of operation. It can readily be adapted to handle different sizes and lengths of taps, and by changing the turret plates it can be adapted to different forms of work pieces as may be required. While in a sense a specialized tool, it has a wide range of practical utility within its field.

Regarding its productive capacity, it may be said that the new machine under the present invention generally takes taps of #10 size and smaller; and when operating in brass, the production runs from 2,000 to 3,000 per hour, where one hole is tapped per piece. This is from two to three times faster than other machines on the market costing much more.

A horizontal machine has been illustrated by way of example, but it will be obvious that the various operating features may equally well be applied to vertical tapping machines or those in any other position.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claim.

I claim:

In a tapping machine, the combination of a tap spindle mounted for rotational motion, thrust bearings holding said spindle against axial motion, a driving motor, a pair of pulleys rotatably mounted on said spindle, belt driving means from the motor to the pulleys rotating the pulleys in opposite directions, a pair of friction clutches driven by said pulleys in opposite directions of rotation, a collar for shifting said clutches axially on the spindle, an arm attached to said collar, a pair of solenoids operating said arm so as to alternately engage said clutches to drive the spindle in either direction and promptly reverse the same, a work holding turret having sockets in which the pieces of work may be inserted to be tapped, an indexing device for aligning the work with the tap spindle, a shaft on which the turret is mounted for axial and rotational movement, the axial movement carrying the work on and off the tap and the rotational movement feeding the work thru the machine, a handle attached to the axially and rotationally movable turret by which the operator may feel the axial tapping action and rotate the turret between taps, and a pair of switches operated by the axial motion of the handle to energize one of said solenoids when the work is going on the tap and to energize the other of said solenoids when the work is going off the tap, whereby the pieces of work may be tapped in rapid succession.

VICTOR BROOK.

REFERENCES CITED

The following references are of record in the file of this patent:

UNITED STATES PATENTS

| Number | Name | Date |
| --- | --- | --- |
| 769,093 | Krepp | Aug. 30, 1904 |
| 1,648,820 | Phillips | Nov. 8, 1927 |
| 1,836,675 | Lyon | Dec. 15, 1931 |
| 1,847,979 | Pruitt | Mar. 1, 1932 |
| 1,970,218 | Bishop et al. | Aug. 14, 1934 |
| 2,166,952 | Goldberg | July 25, 1939 |
| 2,253,492 | Bakewell #2 | Aug. 26, 1941 |
| 2,253,493 | Bakewell | Aug. 26, 1941 |